United States Patent [19]

Kun et al.

[11] Patent Number: 5,043,715

[45] Date of Patent: Aug. 27, 1991

[54] THIN FILM ELECTROLUMINESCENT EDGE EMITTER STRUCTURE WITH OPTICAL LENS AND MULTI-COLOR LIGHT EMISSION SYSTEMS

[75] Inventors: Zoltan K. Kun, Churchill; Juris A. Asars, Murrysville Boro; David Leksell, Oakmont; Robert Mazelsky, Monroeville, all of Pa.

[73] Assignee: Westinghouse Electric Corp., Pittsburgh, Pa.

[21] Appl. No.: 353,316

[22] Filed: May 17, 1989

Related U.S. Application Data

[63] Continuation-in-part of Ser. No. 280,909, Dec. 7, 1988, abandoned, which is a continuation-in-part of Ser. No. 248,868, Sep. 23, 1988, abandoned.

[51] Int. Cl.$^5$ .............................................. G09G 3/30
[52] U.S. Cl. .................................... 340/781; 340/703; 313/502
[58] Field of Search ............... 340/781, 762, 782, 703, 340/701; 313/502, 503, 504, 510, 509

[56] References Cited

U.S. PATENT DOCUMENTS

| | | | |
|---|---|---|---|
| 4,005,402 | 1/1977 | Amano | 340/703 |
| 4,420,711 | 12/1983 | Takahashi et al. | 340/782 |
| 4,535,341 | 8/1985 | Kun et al. | 346/107 R |
| 4,758,828 | 7/1988 | Mitsumori | 340/781 |
| 4,851,824 | 7/1989 | Murata | 340/782 |
| 4,899,184 | 6/1990 | Leksell et al. | 346/107 R |

FOREIGN PATENT DOCUMENTS

| | | |
|---|---|---|
| 0225693 | 6/1987 | European Pat. Off. |
| 0363201 | 4/1990 | European Pat. Off. |
| 0372942 | 6/1990 | European Pat. Off. |

OTHER PUBLICATIONS

Michelitsch, "Light-Emitting, Gallium Arsenide Diode," IBM Technical Disclosure Bulletin, vol. 8, No. 1, Jun. 1965, p. 191.

*Primary Examiner*—Alvin E. Oberley
*Assistant Examiner*—Xiao Min Wu
*Attorney, Agent, or Firm*—John K. Williamson

[57] ABSTRACT

A thin film electroluminescent edge emitter structure includes a common electrode layer and control electrodes disposed above the common electrode layer. At least one dielectric layer is disposed between the common electrode layer and control electrodes, and a phosphor layer is interposed between the one dielectric layer and common electrode layer. The common electrode layer, one dielectric layer and the phosphor layer define the light-emitting pixels of the emitter structure. Each pixel has a light-emitting face formed thereon and is operable upon application of electrical excitation to cause the radiation of light energy within its phosphor layer at least in a direction towards the pixel light-emitting face. An optical lens system associated with the pixels includes a preselected contour shaped on the light-emitting face of each pixel to define an optical lens integral therewith to project the light energy passed therethrough in a preselected direction and form a beam of light energy having a preselected beam pattern. A multi-color light emission system employed by the pixels includes a plurality of phosphor zones composing the phosphor layer and capable of projecting different light energy through the light-emitting faces of the pixels. Also, separate edge emitter structures projecting different colors of light can be utilized in a electrophotographic printer.

24 Claims, 7 Drawing Sheets ic # THIN FILM ELECTROLUMINESCENT EDGE EMITTER STRUCTURE WITH OPTICAL LENS AND MULTI-COLOR LIGHT EMISSION SYSTEMS

CROSS REFERENCE TO RELATED APPLICATIONS

This Application is a continuation-in-part of U.S. Pat. Application Ser. No. 280,909, filed Dec. 7, 1988, now abandoned, which is a continuation-in-part of U.S. Pat. Application Ser. No. 248,868, filed Sept. 23, 1988, now abandoned, and entitled "A Thin Film Electroluminescent Edge Emitter Structure Having An Integral Optical Lens System".

Reference is hereby made to the following copending applications dealing with related subject matter and assigned to the assignee of the present invention:

1. U.S. Pat. Application Ser. No. 254,282, filed Oct. 6, 1988, now U.S. Pat. No. 4,885,488 and entitled "Process For Defining An Array Of Pixels In A Thin Film Electroluminescent Edge Emitter Structure".

2. U.S. Pat. Application Ser. No. 273,296, filed Nov. 18, 1988, now U.S. Pat. No. 5,004,956 and "A Thin Film Electroluminescent Edge Emitter Structure On A Silicon Substrate".

3. U.S. Pat. Application Ser. No. 343,697, filed Apr. 24, 1989 now U.S. Pat. No. 4,899,184, and entitled "A Multiplexed Thin Film Electroluminescent Edge Emitter Structure and Electronic Drive System Therefor.

BACKGROUND OF THE INVENTION

1. Field of the Invention

This invention relates generally to a thin film electroluminescent edge emitter structure, and more particularly, to linearly-arrayed light-emitting pixels of the thin film edge emitter structure incorporating an optical lens system and a multi-color light emission system.

2. Description of the Prior Art

It is well known that an electroluminescent device may be utilized to provide an electronically controlled, high resolution light source. One arrangement which utilizes an electroluminescent device to provide such light source is a flat panel display system, such as disclosed in U.S. Pat. No. (4,110,664) to Asars et al and Luo et al U.s. Pat. No. (4,006,383) which are assigned to the assignee of the present invention. However, in a flat panel display system, light emissions providing the light source are normal to the face of the electroluminescent device and must pass through one of the electrodes. Thus, the thickness of the electroluminescent device and the transmissiveness of the electrode are practical limitations on the brightness of the light emissions which can be attained by the flat panel display system.

Another arrangement utilizing an electroluminescent device to provide such light source is a thin film line array, or edge, emitter, such as disclosed in a U.S. Pat. No. (4,535,341) to Kun et al which is also assigned to the assignee of the present invention. The brightness of the light emissions attained by the thin film electroluminescent edge emitter structure of the Kun et al patent is not subject to the same limitations as the flat panel display system due to the fact that it provides light emissions at the edge of the electroluminescent device. Edge emission come from a depth of the electroluminescent device corresponding to its length, and not to its thickness, and does not pass through one of the electrodes. For reference herein, the length of an electroluminescent device is the distance between its light emitting edge and its opposite nonlight emitting edge. Thus, edge emissions of the thin film line array, or edge, emitter light source are typically 30 to 40 times brighter than the face emissions of the flat panel display light source under approximately the same excitation conditions.

From the above discussion, it can be appreciated that the thin film edge emitter structure of the Kun et al patent potentially provides a high resolution light source promising orders of magnitude of improved performance over the flat panel face emitter structure in terms of light emission brightness. However, many areas of thin film edge emitter structure design are still in need of further improvements to enhance performance overall. Two such areas are the pattern and levels of light energy projected by the edge emitter structure.

SUMMARY OF THE INVENTION

The present invention provides a thin film edge emitter structure designed to satisfy the aforementioned needs. The edge emitter structure of the present invention has linearly-arrayed light-emitting pixels which employ novel features relating to the pattern and levels of light energy projected by pixels of the edge emitter structure. More particularly, the novel features relate to an optical lens system and a multi-color light emission system incorporated in the light-emitting pixels. While these novel features are adapted for working together to facilitate further improvements in the overall performance of the thin film edge emitter structure, it is readily apparent that such features may be incorporated either singly or together in such structure.

Accordingly, the present invention is set forth in a thin film electroluminescent edge emitter structure which preferably includes a common electrode layer, a plurality of control electrodes spaced therefrom, at least one dielectric layer interposed between the common electrode layer and the plurality of control electrodes, and a light-energy generating material in the form of a phosphor layer interposed between the one dielectric layer and the control electrodes and having a light-emitting edge face extending in a direction between the one dielectric layer and control electrodes. Another dielectric layer can be interposed between the common electrode layer and the phosphor layer.

The common electrode layer, the phosphor layer, the one dielectric layer and the control electrodes form a generally stacked laminar arrangement and are disposed on a layer of substrate material. In addition to the edge face of the phosphor layer, the common electrode layer, the one dielectric layer, and the plurality of control electrodes have respective edge faces aligned with one another and with the light-emitting edge face of the phosphor layer. The common electrode layer, the phosphor layer, the one dielectric layer, and the plurality of control electrodes define a plurality of pixels each having a light-emitting edge face. The plurality of control electrodes and the common electrode layer are adapted to be connected with an excitation device for applying an excitation signal to selected pixels. The application of an excitation signal to a selected pixel causes the phosphor layer associated with the pixel to radiate light energy in at least a direction towards its light-emitting face.

One novel feature of the present invention is an optical lens system associated with the edge emitter structure. Preferably, the light-emitting edge face of each pixel is shaped to a preselected contour to define an optical lens integral with the pixel to refract the light energy passing therethrough. Depending upon the specific contour of the integral optical lens, the refracted light energy is projected in a preselected direction and formed into a beam of light energy having a preselected beam pattern.

Another novel feature of the present invention is a multi-color light emission system associated with the edge emitter structure. The phosphor layer is divided into a plurality of phosphor zones each formed from a preselected composition of light-radiating materials. Each of the control electrodes are disposed on the one dielectric layer in alignment with one phosphor zone. The color of the radiated light energy is dependent upon the composition of the light-radiating materials in the phosphor zone.

Still another novel feature of the present invention relates to provision of an electrophotographic printer which utilizes arrays of separate thin film electroluminescent edge emitters projecting different colors of light. In one embodiment, separate edge emitters projecting light are positioned with sets of electrophotographic components about a photoreceptor drum. In another embodiment, separate edge emitters are arrayed to project different colors of light in radial convergent relationship through a lens for focussing the light of each emitter on a photoreceptor drum. In yet another embodiment, separate edge emitters which each project white light are arrayed with different color-sensitive filters for projecting different colors of light onto a multi-color sensitive paper. In still another embodiment, separate edge emitters projecting light are positioned with sets of electrophotographic components serially arranged along a photoreceptor belt.

The novel features of the present invention can be used together to provide an optical lens system with the pixels and to project and pass the colored light energies from the respective phosphor zones of the pixels through the optical lens system and into an overlapping relationship for different photoreceptive applications. Further, the colored light energies projected by the respective pixels into the overlapping relationship are blended at the areas of overlap to form a resultant light image having a color dependent upon the colors of the light energies projected by the pixels.

These and other features and advantages of the present invention will become apparent to those skilled in the art upon a reading of the following detailed description when taken in conjunction with the drawings wherein there is shown and described illustrative embodiments of the invention.

BRIEF DESCRIPTION OF THE DRAWINGS

In the course of the following detailed description, reference will be made to the attached drawings in which.

DESCRIPTION OF THE PREFERRED EMBODIMENTS

In General

Figure 1:
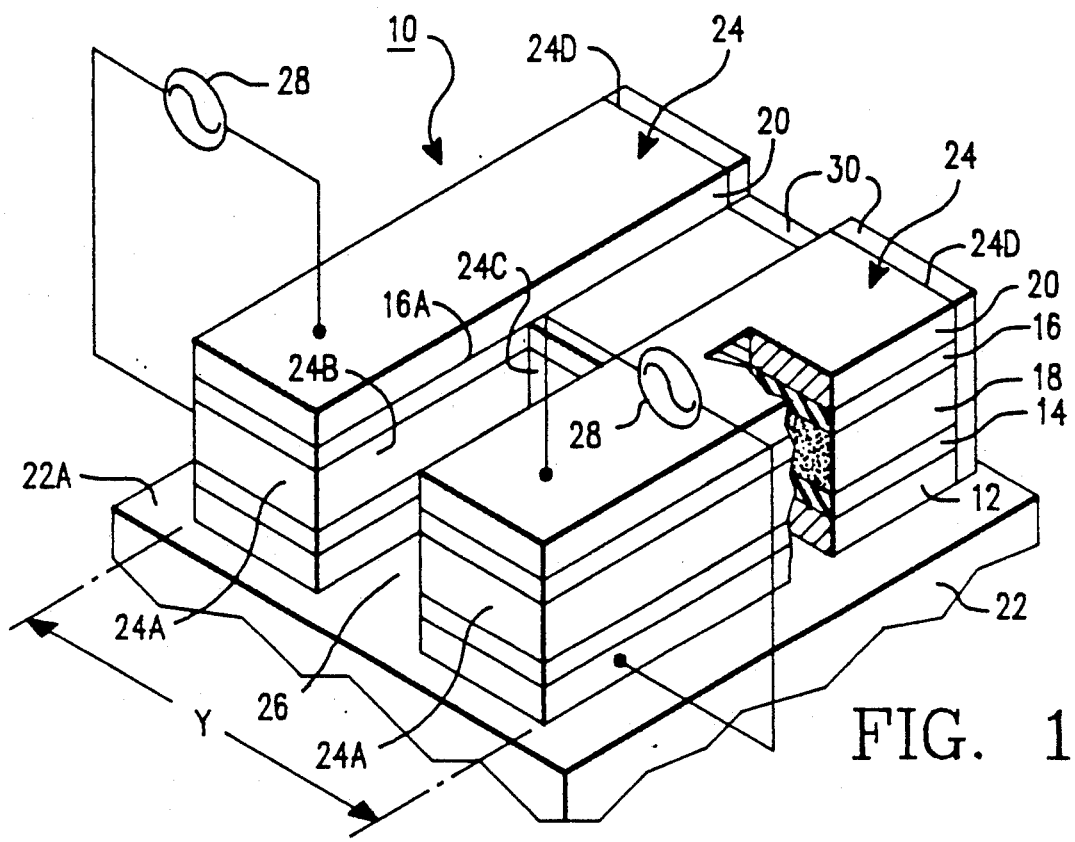
FIG. 1 is a perspective view of a thin film electroluminescent edge emitter structure having a channel formed therein to define a pair of individual light-emitting pixels.
Figure 2:
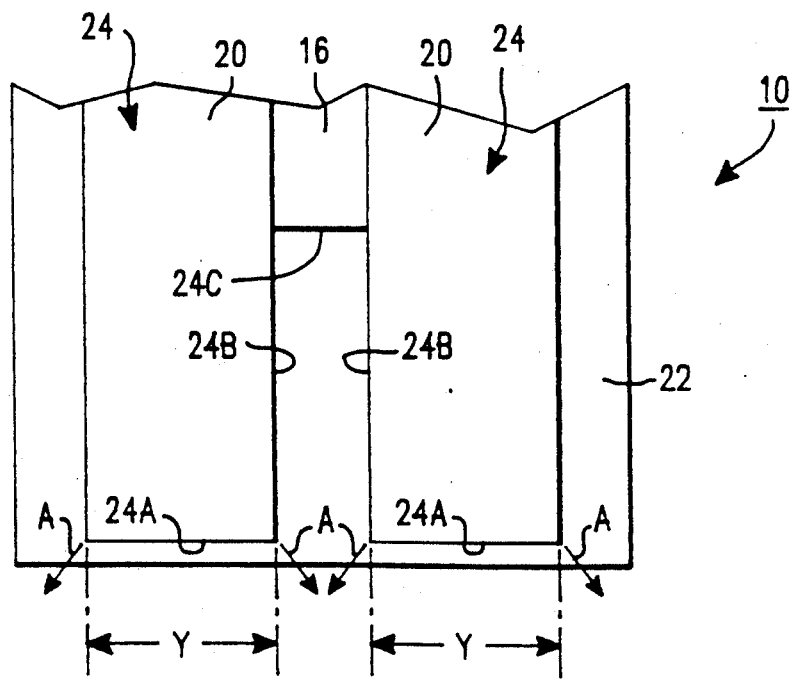
FIG. 2 is a fragmentary top plan view of a forward portion of the edge emitter structure of FIG. 1, illustrating the extremities of the beam formed as the structure is operated to project light energy.

Referring to the drawings, and particularly to FIGS. 1 and 2, there is illustrated an example of an edge emitter structure, such as a thin film electroluminescent (TFEL) edge emitter structure, generally designated by the numeral 10, which may be utilized as a solid state, electronically controlled high resolution light source. Both the construction and operation of this TFEL edge emitter structure are disclosed in the first U.S. patent application cross-reference above which is assigned to the assignee of the present invention.

Referring first to FIG. 1, the TFEL edge emitter structure 10 preferably includes a common electrode layer 12, a first dielectric layer 14, a second dielectric layer 16, a light-energy generating material in the form of a phosphor layer 18, and a plurality (only a pair being shown) of excitation or control electrodes 20. The common electrode layer 12 is disposed on a layer of substrate material 22. The first dielectric layer 14 is disposed on the common electrode layer 12, and the second dielectric layer 16 is spaced from the first dielectric layer 14. The phosphor layer 18 is interposed between first and second dielectric layers 14, 16, and the pair of control electrodes 20 are disposed on the second dielectric layer 16.

It should be understood that although the TFEL edge emitter structure 10 illustrated in FIG. 1 includes first and second dielectric layers 14, 16, one or the other of the first and second dielectric layers may be eliminated from the structure if desired. If the first dielectric layer 14 is not included in the TFEL edge emitter structure 10, then it is apparent that the phosphor layer 18 will be interposed between the common electrode layer 12 and the second dielectric layer 16. Alternatively, if the second dielectric layer 16 is not included in the TFEL edge emitter structure 10, then it is apparent that the phosphor layer 18 will be interposed between the first dielectric layer 14 and the control electrodes 20. Whether the TFEL edge emitter structure 10 has one or two dielectric layers, it operates identically as illustrated and described below with reference to the two dielectric layers 14, 16. It should be understood that the TFEL edge emitter structures illustrated in the other figures may also be formed to include only a single dielectric layer as in the case of the structure 10.

In addition, it should be understood that although first and second dielectric layers 14, 16 are illustrated in FIG. 1 as unitary layers, each dielectric layer may in fact consist of a plurality of sublayers. The sublayers may be formed from different dielectric materials, and those skilled in the art may select the sublayer material utilized depending upon the dielectric properties desired.

The common electrode layer 12, first and second dielectric layers 14, 16, phosphor layer 18, and the pair of control electrodes 20 of the TFEL edge emitter structure 10 form a pair of light-emitting pixels 24 in which the common electrode layer 12 and the first and second dielectric layers 14, 16 with phosphor layer 18 interposed therebetween are common to both pixels 24. As also seen in FIG. 1, a generally rectangular channel 26 is formed in the TFEL edge emitter structure 10 and extends from the top surface 16A of the second dielectric layer 16 downward through the various layers 16, 18, 14, 12 to the top surface 22A of the substrate layer 22. The channel 26 also extends a preselected distance rearwardly from a front or outer edge face 24A of each pixels 24 into the central portion of the TFEL edge emitter structure 10. Opposite lateral sides and an inner end of the channel 26 form opposing lateral edge faces 24B of the adjacent pixels 24 and an inner edge face 24C which extends between and interconnects the opposing lateral edge faces 24B. The channel 26 serves to optically isolate adjacent pixels 24 from one another to prevent optical cross-talk.

Thus, the pair of control electrodes 20 define, in combination with the remaining components of the TFEL edge emitter structure 10, the pair of pixels 24 as illustrated in FIG. 1. Although only a pair of adjacent pixels 24 and one channel 26 are illustrated in FIG. 1, it should be understood that the actual number of pixels 24 and channels 26 which may be formed in a TFEL structure such as TFEL structure 10 will be dependent upon the structure's overall length and the total number of control electrodes 20 actually formed in the layer of control electrode material.

The control electrode 20 of each light-emitting pixel 24 and electrode layer 22 common to the pair of pixels are connected with an electrical excitation source 28. As known in the art, each excitation source 28 is in electrical communication with common electrode layer 12 and one of the pair of control electrodes 20 to provide the excitation signal necessary to excite the electroluminescent phosphor layer 18 common to the pair of pixels 24. Upon the application of an excitation signal to an individual pixel 24, via the one control electrode 20 and the common electrode layer 12, the portion of the phosphor layer 18 associated with the individual pixel radiates light energy which is projected through the light-emitting front edge face 24A of the pixel.

Thus, the front edge faces 24A of the pixels 24 of the TFEL edge emitter structure 10 are the light emission sources of the structure. A rear edge face 24D of each pixel 54 is coated with a layer of non-metallic reflective coating 30. The layer of reflective coating 30 is operable to reflect a great portion of the light present at the rear edge face 24D of an individual pixel 24 in a general direction towards the opposite light-emitting edge face 24A of the pixel.

The pixels 24 of the TFEL edge emitter structure 10 illustrated in FIGS. 1 and 2 have light-emitting faces 24A of planar configuration. Thus, the light energy radiated within phosphor layer 18 of each pixel 24 upon the application of an excitation signal across electrodes 12, 20 is refracted at the planar light-emitting face 24A and projected in a naturally diverging beam pattern to form a constantly expanding beam of light energy whose boundaries are designated by the letters A in FIG. 2. Stated in another manner, since the phosphor layer 18 has a higher index of refraction than the medium adjacent to light-emitting face 24 (i.e. air), and each light-emitting face 24A is planar in configuration, the light energy generated within the phosphor layer 18 of each pixel 24 is refracted at planar light-emitting face thereof 24A and projected through the air medium to form a beam pattern which diverges naturally in a direction Y parallel with the width of the pixel 24. The use of the TFEL edge emitter structure 10 having planar light-emitting pixel faces 24A as a high resolution light source may not be desired in applications which require the high resolution light source to project light energy in a preselected direction and form a beam of light energy having a tightly controlled converging, collimated or diverging beam pattern.

TFEL Edge Emitter With Optical Lens System

Figure 3:
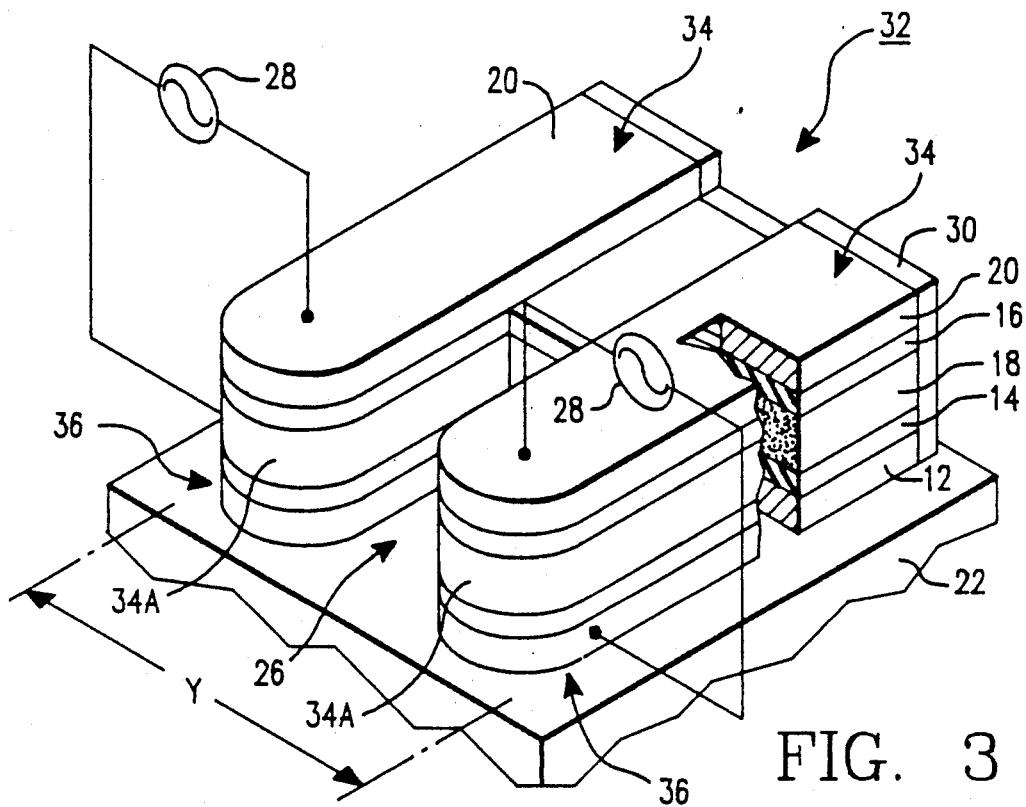
FIG. 3 is a perspective view of one embodiment of the thin film electroluminescent edge emitter structure of the present invention, illustrating the light-emitting face of each pixel in the structure shaped to a preselected contour to form an optical lens integral with the pixel.
Figure 4:
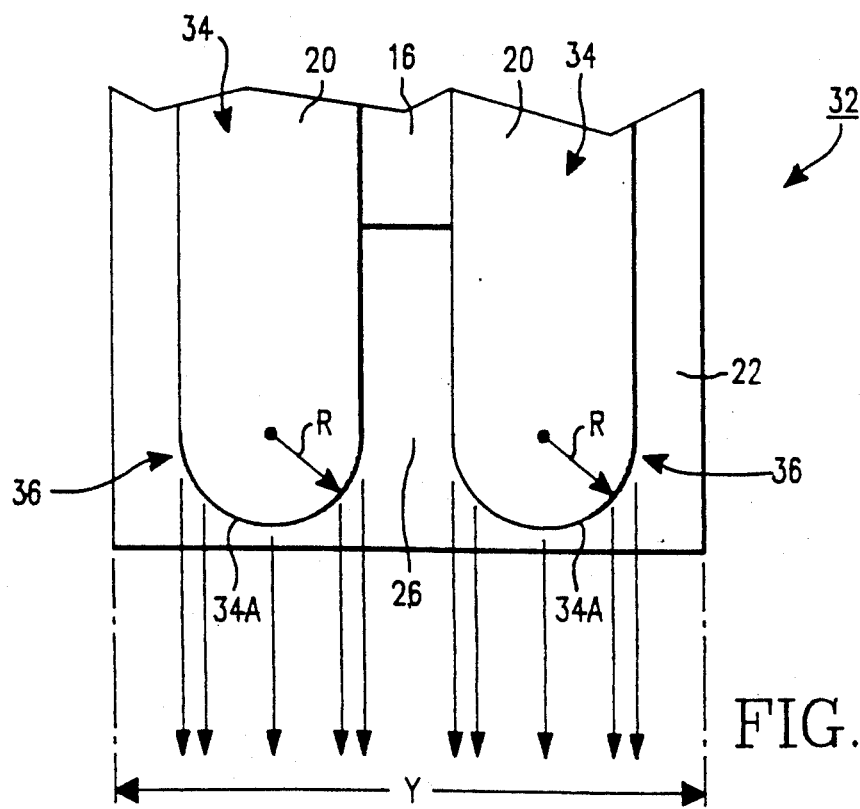
FIG. 4 is a fragmentary top plan view of a forward portion of the thin film edge emitter structure of FIG. 3, illustrating the beams formed by the light energy-projecting lens integral with each pixel as the structure is operated to project light energy.

Referring to FIG. 3, there is illustrated a TFEL edge emitter structure 32 having a plurality of light-emitting pixels 34 now adapted to project radiated light energy in a desired direction and form a beam of light energy having a preselected, tightly controlled beam pattern. The pixels 34 have an optical lens system, generally designated 36, associated with their light-emitting front edge faces 34A in accordance with one novel feature of the present invention. In view that the only difference between the TFEL edge emitter structures 10 (FIG. 1) and 32 (FIG. 3) relate to the configurations of their respective light-emitting edge faces 24A and 34A, the same reference numerals are used to identify components of the edge emitter structure 32 of FIG. 3 that are identical to corresponding components of the structure 10 of FIG. 1 as just described above.

As seen in FIG. 3, the optical lens system 36 is defined by preselected contours shaped or configured on the light-emitting edge faces 34A of the respective pixels 34. In effect, the contours define optical lens integral with the pixels 34. In contrast to the planar configuration of the light-emitting edge faces 24A of the pixels 24, the contours 34 shaped on the light-emitting edge faces 24A of the respective pixels 24 function to permit projecting of light energy passed through the contoured faces 34A in the desired preselected direction and formed in the desired preselected beam pattern. For example, the light-emitting edge face 34A of each pixel 34 illustrated in FIG. 3 is shaped to a convex contour viewed from the front of the pixel. As in the case of the pixels 24 of FIG. 1, the front light-emitting face 34A of each pixel 34 is formed by the front edge faces of the first and second dielectric layers 14, 16, the common and control electrodes 12, 20, and the phosphor layer 18; however, now all of the front edge faces of these same components are configured in the desired preselected contour.

In the same manner as previously described, the application of an electrical excitation signal delivered from excitation source 28 to the phosphor layer 18 of each pixel 34 causes the phosphor layer associated with each pixel to radiate light energy. The light energy radiated within the phosphor layer 18 associated with an individual pixel 34 passes through the phosphor layer in a direction towards the individual pixel light-emitting edge face 34A. Since the index of refraction of phosphor is approximately 2.4, and the index of refraction of the medium external to light-emitting face 34A is, for example, 1.0 for an air medium, it is seen that light energy passing from the interior of an individual pixel phosphor layer 18 to the external medium surrounding the pixel will be refracted at pixel light-emitting face 34A. However, now the preselected contour of the face 34A will tightly control the direction and beam pattern of the light refracted at the face. By varying the contour of an individual pixel light-emitting face 34A, the light energy refracted at the light-emitting face may be projected in a desired direction and shaped into a beam of light energy having a preselected beam pattern.

In addition, the light-emitting face 34A of each pixel 34, and particularly the edge face of each pixel phosphor layer 18, is substantially perpendicular to the phosphor layer itself and also to the common electrode layer 12 and control electrode 20. As a result, the light energy refracted by each pixel integral lens will be oriented in a direction parallel with the width Y of the pair of pixels 34.

Now referring to FIGS. 4 through 7, there are illustrated exemplary embodiments of other preselected contours forming the light energy-projecting lens integral with each of the pixels 34. The length and origin of the radius R, which determines the radius of curvature of the integral optical lens defined by the respective contour of light-emitting edge face 34A, may be varied depending upon whether it is desired to project a beam of light energy having a converging, diverging or collimated beam pattern. Thus, by controlling the length and origin of radius R, the light energy beam pattern may be correspondingly controlled. This allows the beam pattern to be shaped for a specific application.

Figure 5:
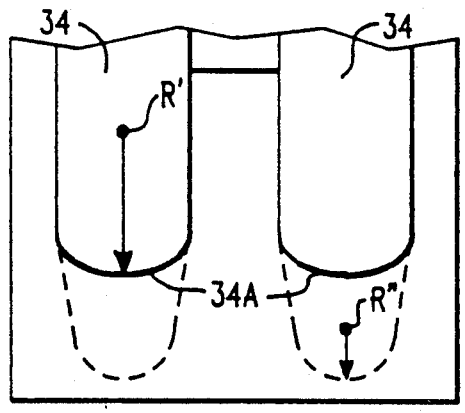
FIG. 5 is a view similar to FIG. 4, illustrating the contour of an alternate embodiment of the light energy-projecting lens integral with each pixel.

As seen in FIG. 5, varying the radius of curvature of each pixel light-emitting face 34A between R' and R" results in a corresponding change in the contour of each light-emitting face. Thus, by selecting a desired radius of curvature for the concave light-emitting face 34A of each pixel 34, the light energy projected at the light-emitting face may have a converging beam pattern with a controlled rate of convergence, a diverging beam pattern with a controlled rate of divergence, or a collimated beam pattern. As previously described with reference to FIG. 3, since the light energy refracted at light-emitting face 34A travels in a direction substantially perpendicular to light-emitting face, the converging, diverging or collimated beam of light energy is oriented parallel to the width Y of the pair of pixels.

Figure 6:
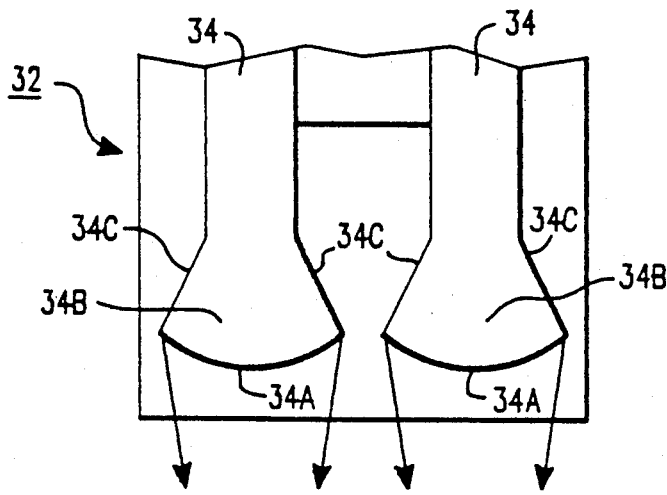
FIG. 6 is a view similar to FIG. 4, illustrating the contour of another alternate embodiment of the light energy-projecting lens integral with each pixel.

FIG. 6 illustrates an outwardly expanding conical end portion 34B on each pixel 34 bounded by a pair of side faces 34C positioned in divergent relationship with each other. The light-emitting front face 34A which forms the integral optical lens extends between and interconnects the side edge faces 34C at their front edges. Each light-emitting face 34A has a convex contour viewed from the front of the pixel 34. As previously described, the radius of curvature of each convex light-emitting face 34A may be varied as required to project light energy in a desired direction and form a beam of light energy having either a converging, diverging or collimated beam pattern.

Figure 7:
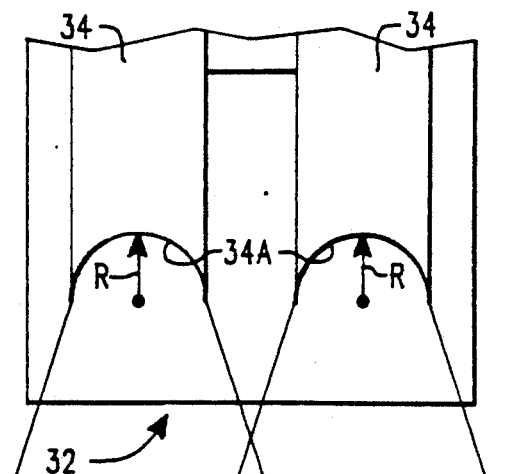
FIG. 7 is a view similar to FIG. 4, illustrating the contour of still another alternate embodiment of the light energy-projecting lens integral with each pixel.

FIG. 7 illustrates pixels 34 each having an integral optical lens on its front light-emitting face 34A defined by a contour of different shaped curvature. Specifically, each light-emitting face 34A has a concave contour viewed from the front of the pixel 34. The origin of the radius R is located forward of the pixel. The integral optical lens defined by the concave contour is operable to project a beam of light energy having a diverging beam pattern, as represented by the arrows. As with the convex light-emitting faces illustrated in FIGS. 3 through 6, the radius of curvature R of each concave light-emitting face 34A in FIG. 7 may be varied to produce a projected beam of light energy having a diverging beam pattern and a controlled rate of divergence.

Figure 8:
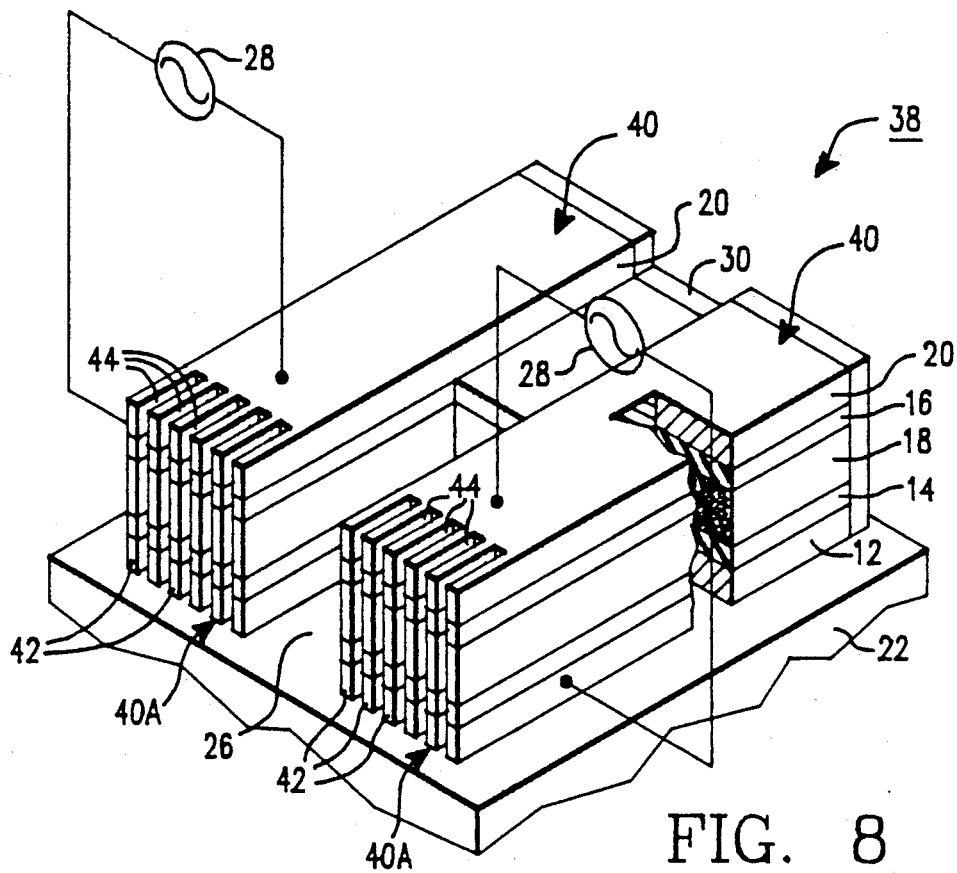
FIG. 8 is a perspective view similar to FIG. 3 of an alternate embodiment of the thin film electroluminescent edge emitter structure of the present invention, illustrating a pair of adjacent pixels each having a serrated light-emitting face.
Figure 9:
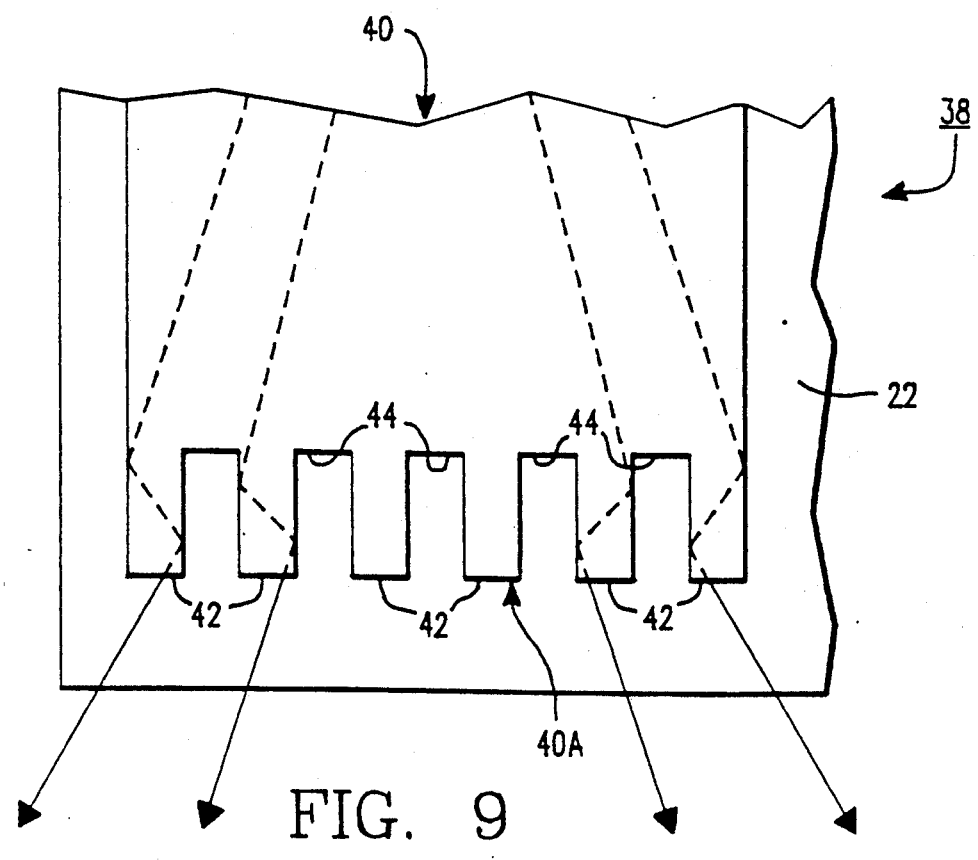
FIG. 9 is a top plan view of a forward portion of one of the pixels of FIG. 8, illustrating a waveguide effect on light energy passed through the serrated light-emitting face of the pixel.

Now referring to FIG. 8, there is illustrated an alternate embodiment of a TFEL edge emitter structure, generally designated 38. Except for the difference to be described below, TFEL- edge emitter structure 38 has a construction generally the same as the TFEL edge emitter structure 10 of FIG. 1, and the components thereof identical to corresponding components of the structure 10 are identified with the same reference numerals. As seen in FIG. 8 and particularly in FIG. 9, the difference is that the light-emitting edge face 40A of each pixel 40 has a generally serrated contour. Specifically, the light-emitting face 40A is formed by a plurality of rectangular protuberances 42 separated from each other by a plurality of recesses 44. As with the light-emitting faces 34A of the pixels 34 described in FIGS. 3 through 7, the light-emitting face 40A of each pixel 40 defines an optical lens integral with the pixel to project the light energy passed therethrough in a preselected direction and form a beam of light energy having a preselected light pattern. Since the optical lens formed by light-emitting face 40A has a serrated contour, as can be realized from FIG. 9 the plurality of protuberances 42 forming the serration act as waveguides to control the rate of divergence of the light energy projected by the pixel.

TFEL Edge Emitter With Multi-Color Light Emission System

Figure 10:
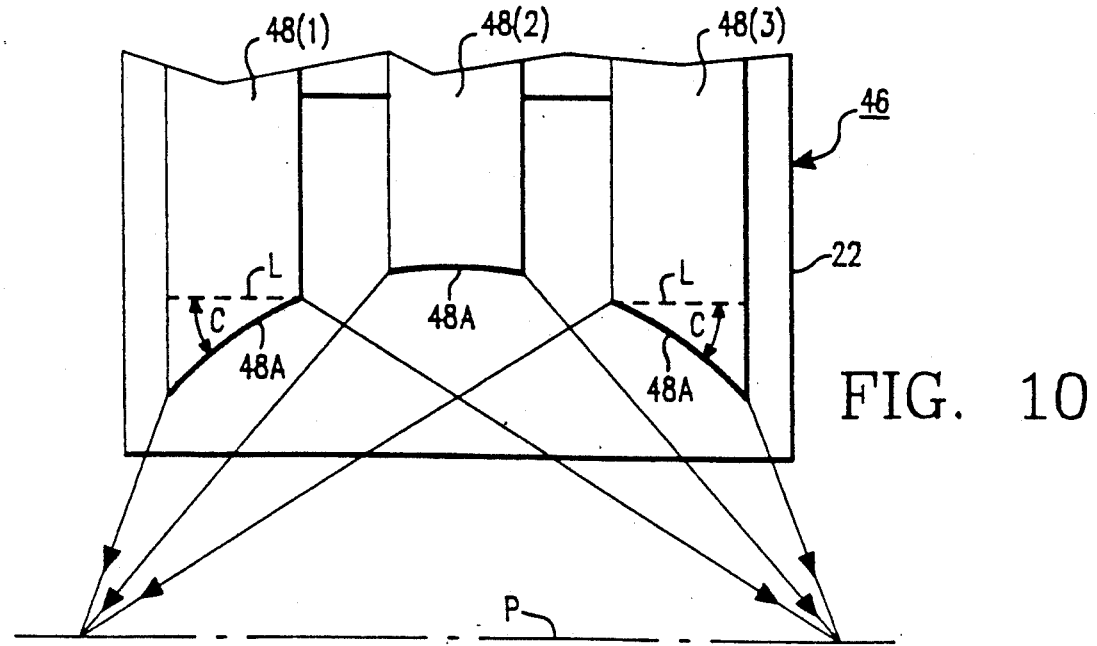
FIG. 10 is a top plan view of a forward portion of three light-emitting pixels positioned in side-by-side relationship, each pixel having a light-emitting face shaped to a preselected contour to project light energy passed therethrough into an overlapping relationship with the light energy projected by the other pixels.

Referring now to FIG. 10, in accordance with another novel feature of the present invention, a multi-color light emission system is associated with a TFEL edge emitter structure, generally designated 46. The TFEL edge emitter structure 46 has a plurality of light-emitting pixels 48, for example, three such pixels 48 positioned in side-by-side relationship on the substrate layer 22. Each pixel 48 illustrated in FIG. 10 has the same layered configuration and components as the pixels 24 and 34 illustrated in FIGS. 1 through 9 and described in detail earlier with reference to the pixels 24 of FIG. 1.

Further, the pixels 48 of the TFEL edge emitter structure 46 employs the optical lens system in accordance with one novel feature of the present invention described above. Before describing the multi-color light emission system associated with the structure 46, the optical lens system of the structure 46 will be briefly described.

Each pixel 48 has an integral, lens-defining light-emitting face 48A shaped to a concave contour viewed from the front of the pixel. By angularly spacing the concave, light-emitting front edge faces 48A of the pair of outer pixels 48 by a preselected angle C from dotted lines L which are perpendicular to the longitudinal directions of the pixels, the beams of light energy projected by the outer pixels 48 are projected into overlapping relationship with the beam of light energy projected by the center pixel 48. Thus, the three pixels 48 positioned in side-by-side relationship project three beams of light energy into overlapping relationship at a plane P. The three beams of light energy are blended at the area of the overlap to form a resultant linear light image at plane P extending between the points of coincident of the arrows in FIG. 10 on the plane 10.

In accordance with the second novel feature of the present invention, the multi-color light emission system is provided in the light-radiating phosphor layer of each pixel 48. The phosphor layer of the TFEL edge emitter structure 46 is divided into a plurality of phosphor zones each formed from a different preselected composition of light-radiating materials. Each different phosphor zone is associated with a different one of the pixels 48 in FIG. 10. The control electrode of each pixel is disposed in alignment with the one phosphor zone of the pixel. Thus, radiation of the particular light energy color of an individual pixel 48 can be controlled by excitation of its control electrode. Therefore, by selecting the specific compositions of light-radiating materials in the phosphor zones within the pixels, the desired spectrum of light energy colors radiated by the pixel can be established.

If, for example, the phosphor layer has a first zone associated with the pixel 48(1) of a first preselected composition of light-radiating materials, a second zone associated with the pixel 48(2) of a second composition of light-radiating materials, and a third zone associated with the pixel 48(3) of a third preselected composition of light-radiating materials, then three beams of light energy at first, second and third preselected colors will be projected into overlapping relationship at the plane P. The contours defining the lenses on the light-emitting edge faces 48A of the pixels 48 cause blending of the three colored beams of light energy at the area of the overlap to form a linear light image having a resultant color dependent on the colors of the first, second and third beams of light energy. The plane P can be a given location on a photoreceptor or a photosensitive paper.

Thus, if the first zone is a red phosphor (ZnS:Sm), the second zone is a green phosphor (ZnS:Tb) and the third zone is a blue phosphor (SrS:Ce), it is seen that the linear image formed at plane P will have a resultant color which is a blend of the colors, red, green and blue. Further, by varying the frequency of the excitation signal across the control and common electrode of one or more pixels, the colored light energy radiated by the phosphor zone(s) associated with the pixel(s) may be varied in intensity. Thus, the individual beam(s) of light energy projected will also vary in intensity. It can be seen that by varying the intensity of a preselected combination of beams of light energy projected into overlapping relationship, a resultant light image may be formed having a desired color.

Figure 11:
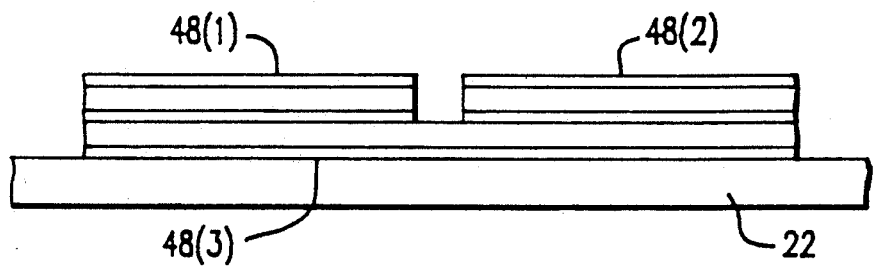
FIG. 11 is a front elevational view of one embodiment of a multi-color array of thin film electroluminescent edge emitters of the present invention.
Figure 12:
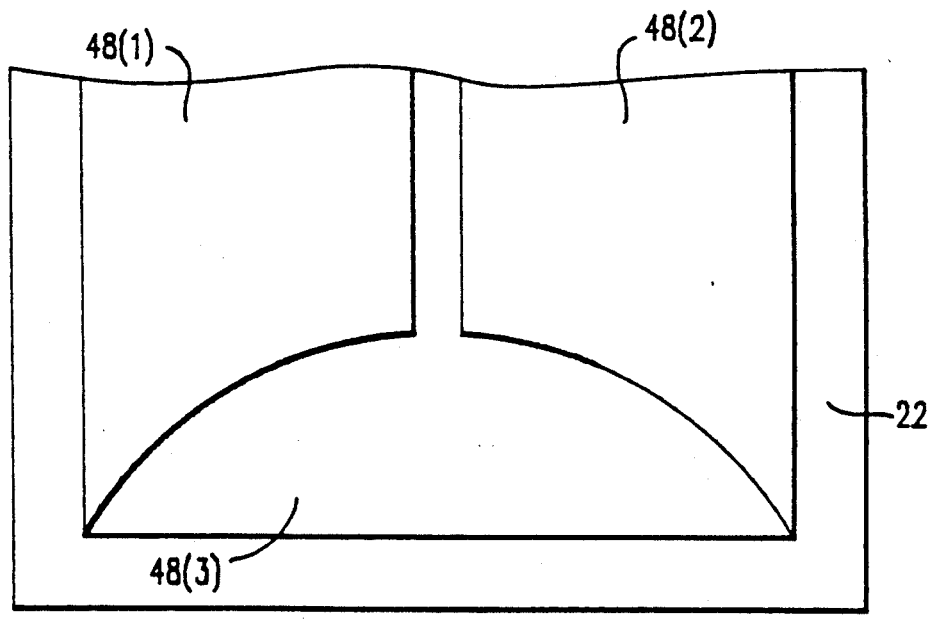
FIG. 12 is a fragmentary top plan view of the multi-color edge emitter array of FIG. 11.
Figure 13:
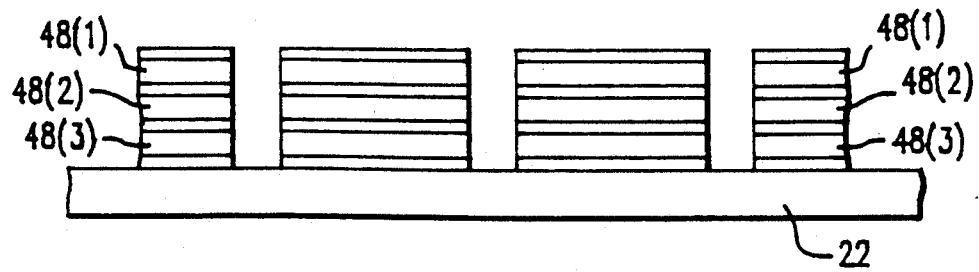
FIG. 13 is a front elevational view of another embodiment of a multi-color edge emitter array of the present invention.

If desired, the trio of different colored light-emitting pixels 48(1)-48(3) can be arrayed differently than the side-by-side arrangement of FIG. 10. FIGS. 11 and 13 illustrate an arrangement of the pixels 48 in stacked arrays. In FIGS. 11 and 12, two of the pixels 48(1) and 48(2) are disposed on top of the third pixel 48(3) of the trio. In FIG. 13, a plurality of pixel stacks are illustrated with each stack being composed of the three pixels 48(1)-48(3) placed one on top of the other.

Multi-Color Arrays of Edge Emitter Structures

In accordance with a third novel feature of the present invention, the multi-color emission system is formed by an array of separate TFEL edge emitter structures 50 projecting light for forming a multi-color image pattern. If desired, the emitter structures 50 can employ the optical lens system described earlier.

Figure 14:
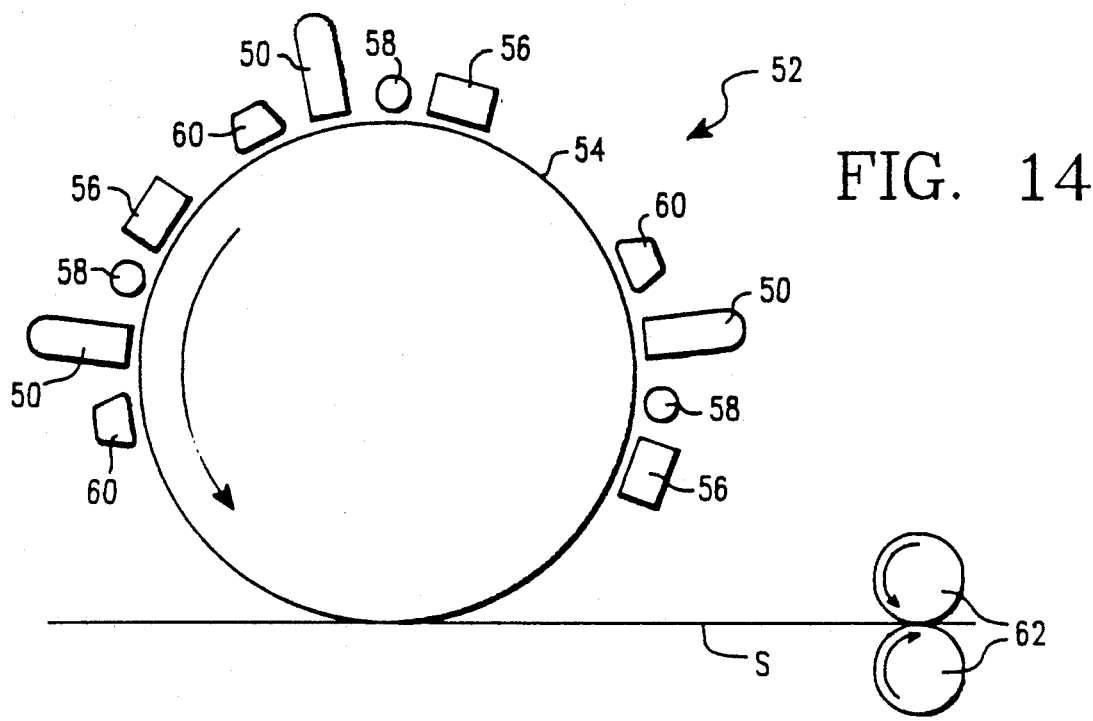
FIG. 14 is a schematic representation of three separate edge emitters projecting light and arrayed with sets of electrophotographic components about a photoreceptor drum.

FIG. 14 depicts schematically an electrophotographic printer 52 having a photoreceptor 54 in the form of a drum and a plurality of sets of electrophotographic components, each of which is conventional per se. The sets of components are serially arranged about the drum 54. The components of each set, also in a serial arrangement along the drum 54, are a cleaner 56, an electrical charge device 58 (such as a corona wire), and a toner 60. Each toner 60 is of a different color, such as red, green and blue. One of the three separate edge emitter structures 50 is disposed within each set between the charge device 58 and the toner 60. Each edge emitter structure 50 projects monochromatic light, exposing three separate sections of the photoreceptor drum 54. Each of the three photoreceptor sections is sensitized to one of the three colors, accepts the different color toners and prints a page in sequence, resulting in a full color page S after three cycles. Fuser rolls 62 are provided downstream of the photoreceptor drum 54 for completing the electrophotographic process.

Figure 15:
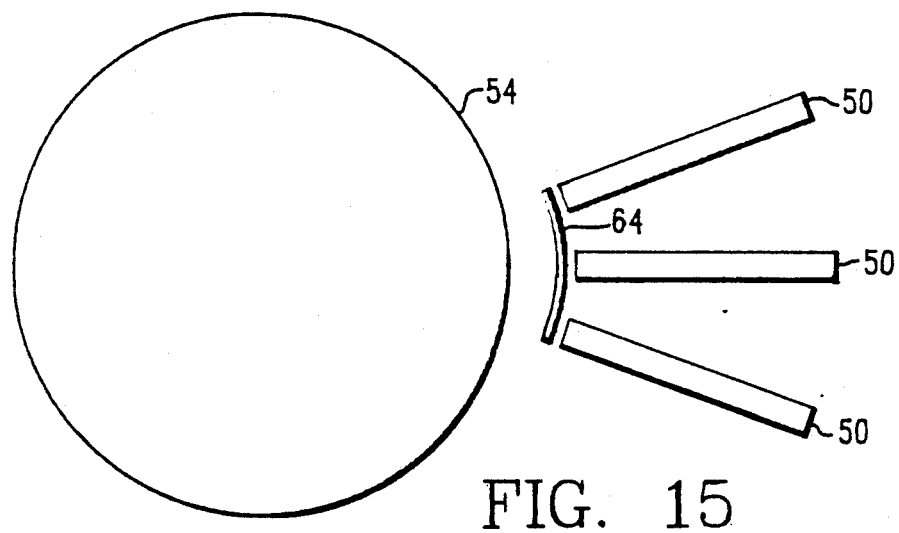
FIG. 15 is a schematic representation of three separate edge emitters arrayed to project different colors of light in radial convergent relationship and aligned with a lens for focussing the light of each emitter on a photoreceptor drum.

FIG. 15 shows schematically another arrangement of separate TFEL edge emitter structures 50 arrayed to project different colors of light for forming a multi-color image pattern on the photoreceptor drum 54. In this arrangement, a lens 64 separate from the edge emitter structures 50 is provided between the light-emitting faces of the structures 50 and the drum 54 for focussing light on the drum 54. The different colored light-emitting edge emitter structures 50 are disposed to project the different colors of light in a radial convergent relationship through the lens 64 to the drum 54.

Figure 16:
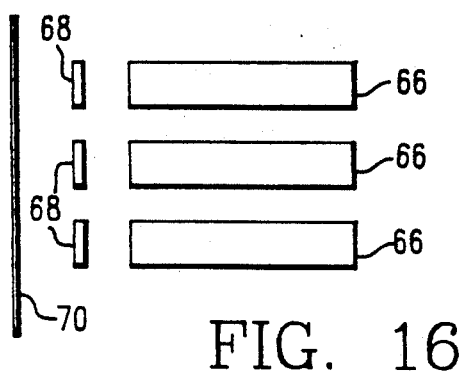
FIG. 16 is a schematic representation of three separate edge emitters arrayed to project white light through three different color-sensitive filters onto a multi-color sensitive paper.

FIG. 16 is a schematic representation of three identical TFEL edge emitter structures 66 which each projects the same white light. In this arrangement, different filters 68 having different color sensitivities are used to obtain the different colors form the white light. The white light from the three edge emitter structures 66 is thus projected through the three different color-sensitive filters 68 onto the multi-color sensitive medium 70 for forming a multi-color image pattern on the medium. One example of the medium 70 is color-sensitive paper marketed under the trademark Cycolor by Mead Imaging of Miamisburg, Ohio. In the case where blue color is not required, three colors can be obtained from a commonly used broad band manganese emission. Three narrow bandpass filters 68 for producing green, yellow and red colors would be used.

Figure 17:
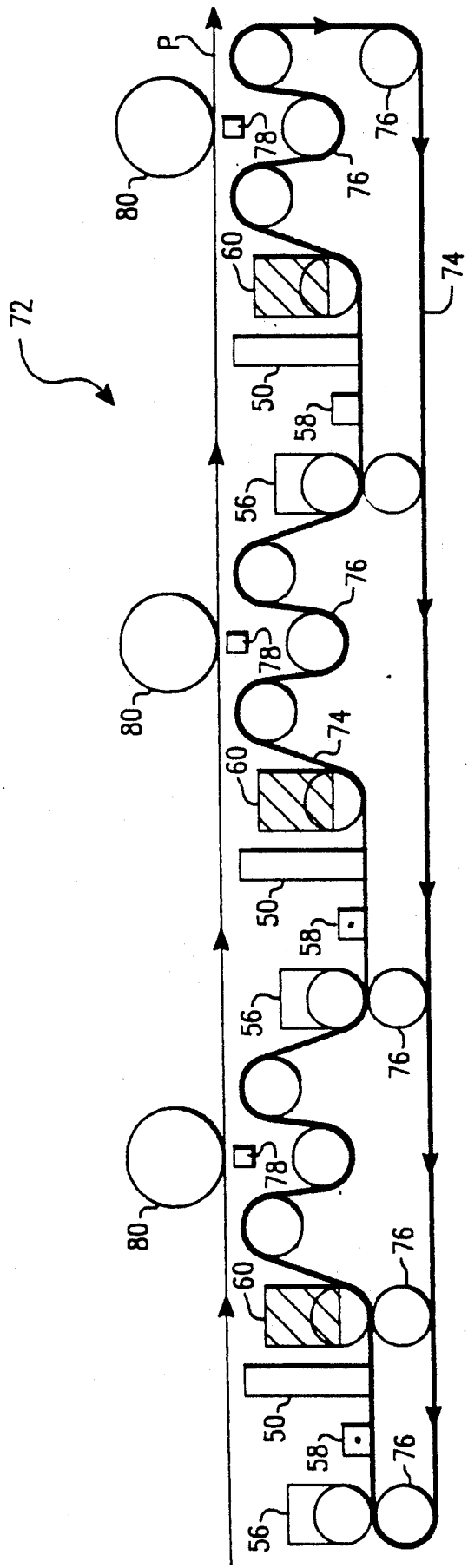
FIG. 17 is a schematic representation of three separate edge emitters and sets of electrophotographic components serially arranged along a photoreceptor belt.

And FIG. 17 shows another electrophotographic printer 72 which is a modification of the printer 52 seen in FIG. 14. The modified printer 72 has the same basic sets of components 56-60 as the printer 52 and so are identified with the same reference numerals. However, instead of the sets of components being arrayed serially about a photoreceptor drum 54, as in printer 52, they are now arranged along a photoreceptor belt 74 which is entrained about a series of rollers 76. Also, now there is a separate fuser 78 associated with each set of components and a drive roll 80 is disposed on an opposite side of each fuser 78 for conveying the paper S.

It is thought that the present invention and many of its attendant advantages will be understood from the foregoing description and it will be apparent that various changes may be made in the form, construction and arrangement of the parts of the invention described herein without departing from the spirit and scope of the invention or sacrificing all of its material advantages, the forms hereinbefore described being merely preferred or exemplary embodiments thereof.

We claim:

1. In an edge emitter structure which includes a plurality of pixels, each pixel having light-energy generating material and a light-emitting edge face, said light-energy generating material upon electrical excitation being operable for radiating light energy through said light-emitting edge faces of said pixels, an optical lens system comprising:
a preselected contour shaped on said light-emitting edge face of each pixel to define an optical lens integral with said pixel face for refracting said light energy passing therefrom so as to project said light energy in a preselected direction and thereby form said light energy into a beam having a preselected beam pattern;
said light-energy generating material being a phosphor material.

2. The edge emitter structure as recited in claim 1, wherein said preselected contour of said light-emitting face of each pixel has a predetermined curvature for refracting said light energy to form a beam of light energy having a converging beam pattern.

3. The edge emitter structure as recited in claim 1, wherein said preselected contour of said light-emitting face of each pixel has a predetermined curvature for refracting said light energy to form a beam of light energy having a collimated beam pattern.

4. The edge emitter structure as recited in claim 1, wherein said preselected contour of said light-emitting face of each pixel has a predetermined curvature for refracting said light energy to form a beam of light energy having a diverging beam pattern.

5. In a thin film electroluminescent edge emitter structure which includes a common electrode layer, a plurality of control electrodes spaced therefrom, at least one dielectric layer interposed between said common electrode layer and said control electrodes, and a phosphor layer interposed between said one dielectric layer and said control electrodes said common electrode layer, phosphor layer, one dielectric layer and control electrodes having respective edge faces aligned with one another and defining a plurality of pixels each having a light-emitting edge face, said phosphor layer upon electrical excitation being operable for radiating light energy through said light-emitting edge faces of said pixels, an optical lens system comprising:
a preselected contour shaped on said light-emitting edge face of each pixel to define an optical lens integral with said pixel face for refracting said light energy passing therefrom so as to project said light energy in a preselected direction said light energy into a beam having a preselected beam pattern.

6. The edge emitter structure as recited in claim 5, wherein:
said common electrode layer and said control electrode of each pixel extend in substantially parallel planes; and
said light-emitting face of each pixel is substantially perpendicular to said planes of said common and control electrodes.

7. The edge emitter structure as recited in claim 6, wherein said light-emitting face of each pixel is positioned relative to said planes of said common and control electrodes such that said beam of light energy projected from said face is oriented in a plane substantially parallel therewith.

8. The edge emitter structure as recited in claim 5, said preselected contour of said light-emitting face of each pixel has a predetermined curvature for refracting said light energy to form a beam of light energy having a converging beam pattern.

9. The edge emitter structure as recited in claim 8, wherein said predetermined curvature of said light-emitting face contour is convex as viewed from the front of said pixel face.

10. The edge emitter structure as recited in claim 5, wherein said preselected contour of said light-emitting face of each pixel has a predetermined curvature for refracting said light energy to form a beam of light energy having a collimated beam pattern.

11. The edge emitter structure as recited in claim 10, wherein said predetermined curvature of said light-emitting face contour is convex as viewed from the front of said pixel face.

12. The edge emitter structure as recited in claim 5, wherein said preselected contour of said light-emitting face of each pixel has a predetermined curvature for refracting said light energy to form a beam of light energy having a diverging beam pattern.

13. The edge emitter structure as recited in claim 12, wherein said predetermined curvature of said light-emitting face contour is concave as viewed from the front of said pixel face.

14. The edge emitter structure as recited in claim 5, wherein said preselected contour of said light-emitting face of each pixel is generally serrated for refracting said light energy to form a beam of light energy having a diverging beam pattern.

15. The edge emitter structure as recited in claim 5, wherein one of said electrodes is disposed on a layer of substrate material.

16. The edge emitter structure as recited in claim 5, wherein another dielectric layer is interposed between said common electrode layer and said phosphor layer.

17. In a thin film electroluminescent edge emitter structure which includes a common electrode layer, a plurality of control electrodes spaced therefrom, at least one dielectric layer interposed between said common electrode layer and said control electrodes, and a phosphor layer interposed between said one dielectric layer and said control electrodes, said common electrode layer, phosphor layer, one dielectric layer and control electrodes having respective edge faces aligned with one another and defining a plurality of pixels each having a light-emitting edge face, said phosphor layer upon electrical excitation being operable for radiating light energy through said light-emitting edge faces of said pixels, a multi-color light emission system comprising:

a plurality of phosphor zones composing said phosphor layer, said zones being formed from different preselected compositions of light-radiating materials for passing light of different colors through said light-emitting edge faces of said pixels;

said light-emitting face of each pixel being shaped to a preselected contour to define an optical lens integral with said pixel face for refracting said color light energy passing therefrom so as to project said colored light energy into an overlapping relationship with the colored light energy refracted and projected by other of said pixels.

18. The edge emitter structure as recited in claim 17, wherein each of said control electrodes disposed on said one dielectric layer is in alignment with one of said phosphor zones.

19. The edge emitter structure as recited in claim 17, wherein said colored light energy projected by said pixels into said overlapping relationship is blended at the area of said overlap to form a resultant light image having a color dependent upon the color of said light energy projected by each of said pixels.

20. The edge emitter structure as recited in claim 17, wherein:

said phosphor zones includes a first zone formed from a first preselected composition of light-radiating materials, a second zone formed from a second preselected composition of light-radiating materials and a third zone formed from a third preselected composition of light-radiating materials;

said first, second and third phosphor zones are associated with first, second and third pixels, respectively; and said light-emitting face of each of said first, second and third pixels is shaped to a preselected contour to project light energy at a first, second and third preselected color into an overlapping relationship for blending at the area of said overlap to form a linear light image having a resultant color determined by said first, second and third preselected colors.

21. The edge emitter structure as recited in claim 20, in which:

said first, second and third colors are selected from a group consisting of the colors, red, blue and green.

22. The edge emitter structure as recited in claim 17, further comprising:

means for varying the frequency of electrical excitation applied to selected ones of said plurality of pixels for varying the intensity of said colored light energy radiated by said selected ones of said pixels.

23. The edge emitter structure as recited in claim 17, wherein another dielectric layer is interposed between said common electrode layer and said phosphor layer.

24. The edge emitter structure as recited in claim 17, wherein said light-emitting edge face each of said pixels has a convex contour as viewed from the front of said pixel face to define an integral, convex optical lens.

* * * * *